United States Patent
Van Egmond

(10) Patent No.: US 10,059,784 B2
(45) Date of Patent: Aug. 28, 2018

(54) PROCATALYST PARTICLES AND POLYMERIZATION PROCESS FOR IMPACT COPOLYMERS

(71) Applicant: W. R. Grace & Co.-Conn., Columbia, MD (US)

(72) Inventor: Jan W. Van Egmond, Charleston, WV (US)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 15/036,365

(22) PCT Filed: Nov. 26, 2014

(86) PCT No.: PCT/US2014/067703
§ 371 (c)(1),
(2) Date: May 12, 2016

(87) PCT Pub. No.: WO2015/081254
PCT Pub. Date: Jun. 4, 2015

(65) Prior Publication Data
US 2016/0297906 A1  Oct. 13, 2016

Related U.S. Application Data

(60) Provisional application No. 61/909,461, filed on Nov. 27, 2013.

(51) Int. Cl.
*C08F 210/06* (2006.01)

(52) U.S. Cl.
CPC .................. *C08F 210/06* (2013.01)

(58) Field of Classification Search
None
See application file for complete search history.

(56) References Cited

U.S. PATENT DOCUMENTS

| | | |
|---|---|---|
| 6,403,518 B2 | 6/2002 | Ward |
| 6,825,146 B2 | 11/2004 | Kilty et al. |
| 8,536,372 B2 | 9/2013 | Chen et al. |
| 2001/0008869 A1 | 7/2001 | Garoff et al. |
| 2005/0054792 A1 | 3/2005 | Kilty et al. |
| 2007/0032375 A1 | 2/2007 | Campbell et al. |
| 2009/0209706 A1 | 8/2009 | Sheard et al. |
| 2010/0173769 A1* | 7/2010 | Gonzalez ................ C08F 10/06 502/107 |
| 2012/0157645 A1 | 6/2012 | Chen et al. |
| 2013/0035227 A1 | 2/2013 | Chen et al. |
| 2013/0225398 A1 | 8/2013 | Chen et al. |

FOREIGN PATENT DOCUMENTS

| | | |
|---|---|---|
| CN | 1124294 C | 10/2003 |
| CN | 1512915 A | 7/2004 |
| CN | 1856512 A | 11/2006 |
| WO | 0008074 A1 | 2/2000 |
| WO | 02096558 A1 | 12/2002 |

OTHER PUBLICATIONS

Chinese Search Report for Application No. 201480064998X dated Feb. 7, 2017.
International Search Report for Application No. PCT/US2014/067703 dated Feb. 10, 2015.
Supplementary European Search Report for Application No. 14865185.4 dated May 29, 2017.

* cited by examiner

*Primary Examiner* — Catherine S Branch
(74) *Attorney, Agent, or Firm* — Lerner, David, Littenberg, Krumholz & Mentlik, LLP

(57) ABSTRACT

Particles of a procatalyst composition having a particle size D50 from 19 microns to 30 microns. A polymerization process comprising halogenating, in the presence of a substituted phenylene aromatic diester, particles of a MagTi procatalyst precursor to form particles of a procatalyst composition having a particle size D50 from 19 microns to 30 microns; first contacting a propylene and optionally one or more first comonomers with a catalyst composition comprising the particles of the procatalyst composition in a first polymerization reactor to form an active propylene-based polymer; and second contacting the active propylene-based polymer with at least one second comonomer in a second polymerization reactor to form a propylene impact copolymer.

17 Claims, No Drawings

PROCATALYST PARTICLES AND POLYMERIZATION PROCESS FOR IMPACT COPOLYMERS

CROSS-REFERENCE TO RELATED APPLICATIONS

The present application is a national phase entry under 35 U.S.C. § 371 of International Application No. PCT/US2014/067703 filed on Nov. 26, 2014, published in English, which claims priority from U.S. Provisional Patent Application No. 61/909,461 filed Nov. 27, 2013, all of which are incorporated herein by reference.

FIELD OF THE INVENTION

This invention relates to particles of a procatalyst composition and a polymerization process for impact copolymers employing the particles thereof.

BACKGROUND

An impact copolymer (ICOP), e.g. propylene impact copolymer, is a heterophasic polymer characterized by a continuous phase that is a propylene-based polymer and a discontinuous elastomeric or "rubber" phase dispersed throughout the continuous phase. A conventional propylene impact copolymer production process is conducted in a two stage process. A first polymer (the continuous phase) is produced in a first polymerization reactor. The product of this first stage is then moved from the first reactor to a second reactor (i.e., impact reactor) where a second polymer (the discontinuous phase) is produced. The discontinuous phase is incorporated within a matrix of the continuous phase, thereby forming the impact copolymer. The resulting material is known as an impact copolymer, and it has beneficial properties, such as good impact resistance while maintaining much of its stiffness modulus. The weight fraction of the rubber material in the final ICOP product is called the fraction copolymer or rubber content, abbreviated Fc.

The discontinuous phase is typically elastomeric or rubbery in nature. This poses many processing difficulties. Due to the tackiness and stickiness of the second polymer, the flowability of the impact copolymer decreases as the amount of elastomer (the discontinuous phase) present in the impact copolymer increases. Decreased flowability is problematic, especially when producing high impact copolymer products (HICOP), e.g., with Fc greater than or equal to 30 weight percent (wt %). For example, particle stickiness and poor flowability of propylene impact copolymer with Fc greater than 30% may cause a number of production problems including but not limited to build up on the impact reactor walls, powder agglomeration, formation of large chunks, and/or hold-ups in the product purge bin resulting in reduced plant throughput or even plant shutdown.

Desirable would be a process for producing an impact copolymer whereby flowability of the polymer particles is maintained or improved as the Fc of the impact copolymer increases—particularly when the Fc for the impact copolymer is greater than 30%.

SUMMARY OF THE INVENTION

Accordingly, one example of the present invention is particles of a procatalyst composition formed from a MagTi (as defined below) procatalyst precursor and a substituted phenylene aromatic diester, wherein the particles of the procatalyst composition have a particle size D50 from 19 microns to 30 microns.

Another example of the present invention is a polymerization process comprising halogenating, in the presence of a substituted phenylene aromatic diester, particles of a MagTi procatalyst precursor having a particle size D50 from 19 microns to 30 microns to form particles of a procatalyst composition having a particle size D50 from 19 microns to 30 microns. The polymerization process may further comprise first contacting, under first polymerization conditions, propylene and optionally one or more first comonomers with a catalyst composition comprising the particles of the procatalyst composition in a first polymerization reactor to form an active propylene-based polymer and second contacting, under second polymerization conditions, the active propylene-based polymer with at least one second comonomer in a second polymerization reactor to form a propylene impact copolymer. The at least one second comonomer may be olefin.

An advantage of one embodiment of the present invention is a process for improving flowability for propylene impact copolymer, particularly propylene high rubber content impact copolymer (HICOP) with Fc greater than 30%.

Another advantage of one embodiment of the present invention is a process for improving flowability for propylene impact copolymer made from a Ziegler-Natta catalyst composition that contains a substituted phenylene aromatic diester.

DETAILED DESCRIPTION

The present invention is described with reference to embodiments of the invention.

One embodiment of the present invention is particles of a procatalyst composition formed from a MagTi procatalyst precursor and a substituted phenylene aromatic diester, wherein the particles of the procatalyst composition have a particle size D50 from 19 microns to 30 microns, preferably from 25 microns to 30 microns. The MagTi procatalyst precursor particles may have a D50 from 19 microns to 30 microns, preferably from 25 microns to 30 microns. The substituted phenylene aromatic diester may be 3-methyl-5-t-butyl-1,2-phenylene dibenzoate.

The procatalyst composition and the MagTi procatalyst precursor may each be composed of particles having a particle size D50 from 19 microns, or 20 microns, or 21 microns, or 22 microns, or 23 microns, or 24 microns, or 25 microns, or 26 microns, or 27 microns to 28 microns, or 29 microns, or 30 microns. In another embodiment, the procatalyst composition particles have a D50 from 25 microns, or 26 microns, or 27 microns to 28 microns, or 29 microns, or 30 microns.

The procatalyst composition and the MagTi procatalyst precursor may also each be a plurality of particles having a D90 from 19 microns, or 20 microns, or 21 microns, or 22 microns, or 23 microns, or 24 microns, or 25 microns, or 26 microns, or 27 microns to 28 microns, or 29 microns, or 30 microns. In another embodiment, the procatalyst composition particles have a D90 from 25 microns, or 26 microns, or 27 microns to 28 microns, or 29 microns, or 30 microns.

The procatalyst composition may be a plurality of particles of $Mg_3Ti(OEt)_8Cl_2$ complexed with 3-methyl-5-t-butyl-1,2-phenylene dibenzoate, the procatalyst composition particles having a D50 from 25 or 26 microns, or 27 microns to 28 microns, or 29 microns, or 30 microns, wherein Et represents ethylene.

Another embodiment of the present invention provides a polymerization process. The polymerization process includes halogenating a magnesium/titanium (or "MagTi") procatalyst precursor in the presence of a substituted phenylene aromatic diester (or "SPAD") to form particles of a procatalyst composition having a particle size D50 from 19 microns to 30 microns. The MagTi procatalyst precursor is a solid particulate in form and has a particle size D50 from 19 microns to 30 microns. The polymerization process may further include first contacting, under first polymerization conditions, propylene and optionally one or more first comononers with a catalyst composition to form an active propylene-based polymer. The catalyst composition may include the particles of the present procatalyst composition, a cocatalyst, and optionally an external electron donor. The polymerization process may further include second contacting, under second polymerization conditions, the active propylene-based polymer with at least one second comonomer in a second polymerization reactor to form a propylene impact copolymer. The at least one second comonomer may be olefin.

The polymerization process is further described herein in detail with reference to specific steps of halogenation, first polymerization, and second polymerization in accordance with embodiments of the invention.

1. Halogenation

One embodiment of the present invention is a polymerization process which includes halogentating the MagTi procatalyst precursor in the presence of an internal electron donor, namely the substituted phenylene aromatic diester, SPAD. The "magnesium/titanium procatalyst precursor," or "MagTi procatalyst precursor" has the formula $Mg_d Ti(OR^e)_f X_g$ wherein $R^e$ is an aliphatic or aromatic hydrocarbon radical having 1 to 14 carbon atoms or COR' wherein R' is an aliphatic or aromatic hydrocarbon radical having 1 to 14 carbon atoms; each $OR^e$ group is the same or different; X is independently chlorine, bromine or iodine, preferably chlorine; d is 0.5 to 56, or 2 to 4; f is 2 to 116 or 5 to 15; and g is 0.5 to 116, or 1 to 3. The MagTi procatalyst precursor may be prepared by controlled precipitation through removal of an alcohol from the precursor reaction medium used in their preparation. The reaction medium may comprise a mixture of an aromatic liquid, such as a chlorinated aromatic compound, or chlorobenzene, with an alkanol, especially ethanol. Suitable halogenating agents may include titanium tetrabromide, titanium tetrachloride or titanium trichloride, especially titanium tetrachloride. Removal of the alkanol from the solution used in the halogenation results in precipitation of the solid precursor having desirable morphology and surface area.

The MagTi procatalyst precursor may be a plurality of particles that are uniform in particle size, the MagTi procatalyst precursor particles having a D50 from 19 microns, or 20 microns, or 21 microns, or 22 microns, or 23 microns, or 24 microns, or 25 microns, or 26 microns, or 27 microns to 28 microns, or 29 microns, or 30 microns. The term "D50," as used herein, is the median particle diameter such that 50% of the sample weight is above the stated particle diameter. In an embodiment, the MagTi procatalyst precursor particles have a D50 from 25 microns, or 26 microns, or 27 microns to 28 microns, or 29 microns, or 30 microns.

In one embodiment, the MagTi procatalyst precursor is a plurality of particles having a D90 from 19 microns, or 20 microns, or 21 microns, or 22 microns, or 23 microns, or 24 microns, or 25 microns, or 26 microns, or 27 microns to 28 microns, or 29 microns, or 30 microns. The term "D90," as used herein, is the median particle diameter such that 90% of the sample weight is above the stated particle diameter. In another embodiment, the MagTi procatalyst precursor particles have a D90 from 25 microns, or 26 microns, or 27 microns to 28 microns, or 29 microns, or 30 microns.

In one embodiment, the MagTi procatalyst precursor is a plurality of particles of $Mg_3Ti(OEt)_8Cl_2$, the particles having a D50 from 25 microns to 30 microns, wherein Et represents ethylene.

Halogenation (or halogenating) may occur by way of a halogenating agent. A "halogenating agent," as used herein, is a compound that converts the procatalyst precursor (or procatalyst intermediate) into a halide form. A "titanating agent," as used herein, is a compound that provides the catalytically active titanium species. Halogenation and titanation may convert the magnesium moiety present in the procatalyst precursor into a magnesium halide support upon which the titanium moiety (such as a titanium halide) is deposited.

The halogenating agent may be a titanium halide having the formula $Ti(OR^e)_f X_h$, wherein $R^e$ and X are defined as above, f is an integer from 0 to 3; h is an integer from 1 to 4; and f+h is 4. In this way, the titanium halide is simultaneously the halogenating agent and the titanating agent. In one embodiment, the titanium halide is $TiCl_4$ and halogenation may occur by way of chlorination of the procatalyst precursor with the $TiCl_4$. The chlorination (and titanation) may be conducted in the presence of a chlorinated or a non-chlorinated aromatic or aliphatic liquid, such as dichlorobenzene, o-chlorotoluene, chlorobenzene, benzene, toluene, xylene, octane, or 1,1,2-trichloroethane. In yet another embodiment, the halogenation and the titanation are conducted by use of a mixture of halogenating agent and chlorinated aromatic liquid comprising from 40 to 60 volume percent halogenating agent, such as $TiCl_4$.

In one embodiment, the reaction mixture is heated to a temperature from about 30° C. to about 150° C. for a duration of about 2 minutes to about 100 minutes during halogenation (chlorination).

The halogenation reaction may be performed in the presence of the SPAD which is the internal electron donor. As used herein, an "internal electron donor" (or "IED") is a compound added or otherwise formed during formation of the procatalyst composition that donates at least one pair of electrons to one or more metals present in the resultant procatalyst composition. Not wishing to be bound by any particular theory, it is believed that during halogenation (and titanation) the internal electron donor (1) regulates the formation of active sites and thereby enhances catalyst stereoselectivity, (2) regulates the position of titanium on the magnesium-based support, (3) facilitates conversion of the magnesium and titanium moieties into respective halides and (4) regulates the crystallite size of the magnesium halide support during conversion. Thus, provision of the internal electron donor yields a procatalyst composition with enhanced stereoselectivity.

The internal electron donor, SPAD, may be added before, during, or after the heating of the reaction mixture. The internal electron donor may be added before, during, or after addition of the halogenating agent to the procatalyst precursor. The halogenation of the MagTi procatalyst precursor may proceed in the presence of the SPAD.

The internal electron donor may be a substituted phenylene aromatic diester. The substituted phenylene aromatic diester may be a substituted 1,2-phenylene aromatic diester, a substituted 1,3-phenylene aromatic diester, or a substituted 1,4-phenylene aromatic diester. In one embodiment, a 1,2- phenylene aromatic diester is provided. The substituted 1,2-phenylene aromatic diester has the structure (I) below.

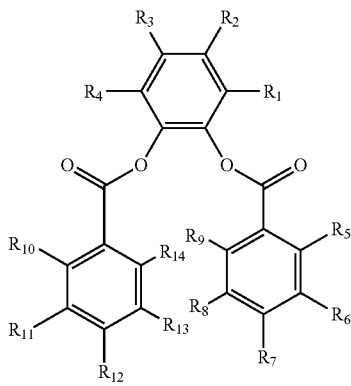

wherein $R_1$-$R_{14}$ are the same or different. Each of $R_1$-$R_{14}$ may be independently selected from a hydrogen, substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. At least one of $R_1$-$R_{14}$ is not hydrogen. In other words, at least one of $R_1$-$R_{14}$ is a substituent other than hydrogen.

As used herein, the term "hydrocarbyl" and "hydrocarbon" refer to substituents containing only hydrogen and carbon atoms, including branched or unbranched, saturated or unsaturated, cyclic, polycyclic, fused, or acyclic species, and combinations thereof. Nonlimiting examples of hydrocarbyl groups include alkyl-, cycloalkyl-, alkenyl-, alkadienyl-, cycloalkenyl-, cycloalkadienyl-, aryl-, aralkyl, alkylaryl, and alkynyl-groups.

As used herein, the terms "substituted hydrocarbyl" and "substituted hydrocarbon" refer to a hydrocarbyl group that is substituted with one or more nonhydrocarbyl substituent groups. A nonlimiting example of a nonhydrocarbyl substituent group is a heteroatom. As used herein, a "heteroatom" refers to an atom other than carbon or hydrogen. The heteroatom can be a non-carbon atom from Groups IV, V, VI, and VII of the Periodic Table. Nonlimiting examples of heteroatoms include: halogens (F Cl, Br, I), N, O, P, B, S, and Si. A substituted hydrocarbyl group also includes a halohydrocarbyl group and a silicon-containing hydrocarbyl group. As used herein, the term "halohydrocarbyl" group refers to a hydrocarbyl group that is substituted with one or more halogen atoms. As used herein, the term "silicon-containing hydrocarbyl group" is a hydrocarbyl group that is substituted with one or more silicon atoms. The silicon atom(s) may or may not be in the carbon chain.

In one embodiment, the SPAD with Structure (I) includes each of $R_1$-$R_{14}$ independently selected from a hydrogen, substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. At least one of $R_1$-$R_4$ is a hydrocarbyl group having 1 to 20 carbon atoms, an alkoxy group having 1 to 20 carbon atoms, a heteroatom, and combinations thereof. In a further embodiment, at least one of $R_1$-$R_4$ is a hydrocarbyl group having 1 to 6 carbon atoms.

In one embodiment, the SPAD with Structure (I) includes each of $R_1$-$R_{14}$ independently selected from a hydrogen, substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. At least two of $R_1$-$R_4$ are a hydrocarbyl group having 1 to 20 carbon atoms, an alkoxy group having 1 to 20 carbon atoms, a heteroatom, and combinations thereof. In a further embodiment, at least two of $R_1$-$R_4$ are a hydrocarbyl group having 1 to 6 carbon atoms.

Nonlimiting examples of suitable SPAD for the internal electron donor are provided in Table 1 below.

TABLE 1

| Compound | Structure |
| --- | --- |
| 3-methyl-5-tert-butyl-1,2-phenylene dibenzoate | |
| 3,5-diisopropyl-1,2-phenylene dibenzoate | |
| 3,6-dimethyl-1,2-phenylene dibenzoate | |
| 4-t-butyl-1,2-phenylene dibenzoate | |

TABLE 1-continued

| Compound | Structure |
|---|---|
| 4-methyl 1,2-phenylene dibenzoate | |
| 1,2-naphthalene dibenzoate | |
| 2,3-naphthalene dibenzoate | |
| 3-methyl-5-tert-butyl-1,2-phenylene di(4-ethylbenzoate) | |
| 3-methyl-5-tert-butyl-1,2-phenylene di(2,4,6-trimethylbenzoate) | |
| 3-methyl-5-tert-butyl-1,2-phenylene di(4-fluorobenzoate) | |

TABLE 1-continued

| Compound | Structure |
|---|---|
| 3-methyl-5-tert-butyl-1,2-phenylene di(4-chlorobenzoate) | |
| 3-methyl-6-isopropyl-1,2-phenylene dibenzoate | |
| 3,6-dimethyl-1,2-phenylene dibenzoate | |
| 3,6-di-tert-butyl-1,2-phenylene dibenzoate | |
| 3,4,6-triisopropyl-1,2-phenylene dibenzoate | |
| 3,6-dimethyl-4-isopropyl-1,2-phenylene dibenzoate | |

TABLE 1-continued

| Compound | Structure |
|---|---|
| 3-methyl-1,2-phenylene dibenzoate | |
| 3-tert-butyl-1,2-phenylene dibenzoate | |

In one embodiment, the substituted phenylene aromatic diester is 3-methyl-5-t-butyl-1,2-phenylene dibenzoate.

The reaction product of the halogenation step is a procatalyst composition. The procatalyst composition may be a Ziegler-Natta catalyst composition. The procatalyst composition may be formed from the MagTi procatalyst precursor and the SPAD internal electron donor. The procatalyst composition may be a combination of a magnesium moiety, a titanium moiety, complexed with the substituted phenylene aromatic diester (i.e., the internal electron donor). The procatalyst composition may be composed of particles having a particle size D50 from 19 microns, or 20 microns, or 21 microns, or 22 microns, or 23 microns, or 24 microns, or 25 microns, or 26 microns, or 27 microns to 28 microns, or 29 microns, or 30 microns. In one embodiment, the procatalyst composition particles have a D50 from 25 microns, or 26 microns, or 27 microns to 28 microns, or 29 microns, or 30 microns.

In one embodiment, the procatalyst composition is a plurality of particles having a D90 from 19 microns, or 20 microns, or 21 microns, or 22 microns, or 23 microns, or 24 microns, or 25 microns, or 26 microns, or 27 microns to 28 microns, or 29 microns, or 30 microns. In another embodiment, the procatalyst composition particles have a D90 from 25 microns, or 26 microns, or 27 microns to 28 microns, or 29 microns, or 30 microns.

In one embodiment, the procatalyst composition is a plurality of particles of $Mg_3Ti(OEt)_8Cl_2$ complexed with 3-methyl-5-t-butyl-1,2-phenylene dibenzoate, the procatalyst composition particles having a D50 from 25 or 26 microns, or 27 microns to 28 microns, or 29 microns, or 30 microns.

2. First Polymerization

One embodiment of the present invention is a polymerization process which includes first contacting, under first polymerization conditions, propylene and optionally one or more first comonomers with a catalyst composition comprising the particles of the present procatalyst composition in a first polymerization reactor to form an active propylene-based polymer. The catalyst composition may include the particles of the present procatalyst composition (formed from the MagTi procatalyst precursor and SPAD with particle size D50 from 19-30 microns as disclosed above), a cocatalyst, and optionally an external electron donor.

As used herein, an "active propylene-based polymer" is a propylene-based polymer containing an amount of active catalyst that is capable of further polymerization upon exposure to an olefin under polymerization conditions.

The catalyst composition may include a cocatalyst. The cocatalyst may be an organoaluminum compound, such as trialkylaluminum-, dialkylaluminum hydride-, alkylaluminum dihydride-, dialkylaluminum halide-, alkylaluminumdihalide-, dialkylaluminum alkoxide-, and alkylaluminum dialkoxide-compounds containing from 1-10, preferably 1-6 carbon atoms in each alkyl- or alkoxide-group. In one embodiment, the cocatalyst is a $C_{1-4}$ trialkylaluminum compound, such as triethylaluminum (TEA).

The catalyst composition optionally includes an external electron donor. In one embodiment, the catalyst composition includes a mixed external electron donor (MEED) composed of one or more selectivity control agents (SCA) and one or more activity limiting agents (ALA). The SCA is an alkoxysilane having the general formula: $SiR_m(OR')_{4-m}$ (I) where R independently each occurrence is hydrogen or a hydrocarbyl or an amino group optionally substituted with one or more substituents containing one or more Group 14, 15, 16, or 17 heteroatoms R contains up to 20 atoms not counting hydrogen and halogen R' is a $C_{1-20}$ alkyl group, and m is 0, 1, 2 or 3. In an embodiment, R is $C_{6-12}$ aryl, alkyl or aralkyl, $C_{3-12}$ cycloallyl, $C_{3-12}$ branched alkyl, or $C_{3-12}$ cyclic amino group, and R' is $C_{1-4}$ allyl, and m is 1 or 2.

Nonlimiting examples of suitable alkoxysilane compositions include dicyclopentyldimethoxysilane, di-tert-butyldimethoxysilane, methylcyclohexyldimethoxysilane, methylcyclohexyldiethoxysilane, di-n-butyldimethoxysilane, ethylcyclohexyldimethoxysilane, diphenyldimethoxysilane, diisopropyldimethoxysilane, di-n-propyldimethoxysilane, diisobutyldimethoxysilane, diisobutyldiethoxysilane, di-n-butyldimethoxysilane, cyclopentyltrimethoxysilane, isopropyltrimethoxysilane, n-propyltrimethoxysilane, n-propyltriethoxysilane, ethyltriethoxysilane, tetramethoxysilane, tetraethoxysilane, cyclopentylpyrrolidinodimethoxysilane, bis(pyrrolidino)dimethoxysilane, bis(perhydroisoquinolino)dimethoxysilane, and dimethyldimethoxysilane.

The SCA may be selected from dicyclopentyldimethoxysilane, methylcyclohexyldimethoxysilane, and n-propyltrimethoxysilane, and combinations thereof.

The MEED may include one or more activity limiting agents. As used herein, an "activity limiting agent" ("ALA") is a material that reduces catalyst activity at elevated temperature (i.e., temperature greater than about 85° C.). An ALA inhibits or otherwise prevents polymerization reactor upset and ensures continuity of the polymerization process. Typically, the activity of Ziegler-Natta catalysts increases as the reactor temperature rises. Ziegler-Natta catalysts also typically maintain high activity near the melting point temperature of the polymer produced. The heat generated by the exothermic polymerization reaction may cause polymer particles to form agglomerates and may ultimately lead to disruption of continuity for the polymer production process. The ALA reduces catalyst activity at elevated temperature, thereby preventing reactor upset, reducing (or preventing) particle agglomeration, and ensuring continuity of the polymerization process.

The ALA may be an aliphatic carboxylic acid ester. The aliphatic carboxylic acid ester may be a $C_4$-$C_{30}$ aliphatic acid ester, may be a mono- or a poly-(two or more) ester, may be straight chain or branched, may be saturated or unsaturated, and any combination thereof. The $C_4$-$C_{30}$ aliphatic acid ester may also be substituted with one or more Group 14, 15 or 16 heteroatom containing substituents. Nonlimiting examples of suitable $C_4$-$C_{30}$ aliphatic acid esters include $C_{1-20}$ alkyl esters of aliphatic $C_{4-30}$ monocarboxylic acids, $C_{1-20}$ alkyl esters of aliphatic $C_{8-20}$ monocarboxylic acids, $C_{1-4}$ allyl mono- and diesters of aliphatic $C_{4-20}$ monocarboxylic acids and dicarboxylic acids, $C_{1-4}$ alkyl esters of aliphatic $C_{8-20}$ monocarboxylic acids and dicarboxylic acids, and $C_{4-20}$ mono- or polycarboxylate derivatives of $C_{2-100}$ (poly)glycols or $C_{2-100}$ (poly)glycol ethers. In one embodiment, the $C_4$-$C_{30}$ aliphatic acid ester may be a laurate, a myristate, a palmitate, a stearate, an oleates, a sebacate, (poly)(alkylene glycol) mono- or diacetates, (poly)(alkylene glycol) mono- or di-myristates, (poly)(alkylene glycol) mono- or di-laurates, (poly)(alkylene glycol) mono- or di-oleates, glyceryl tri(acetate), glyceryl tri-ester of $C_{2-40}$ aliphatic carboxylic acids, and mixtures thereof. In another embodiment, the $C_4$-$C_{30}$ aliphatic ester is isopropyl myristate or di-n-butyl sebacate.

In an embodiment, the ALA is isopropyl myristate.

In an embodiment, the ALA is di-n-butyl sebacate.

In an embodiment, the MEED is any combination of (i) n-propyltrimethoxysilane, methylcyclohexyldimethoxysilane, dicyclopentyldimethoxysilane and/or diisopropyldimethoxysilane with (ii) any combination of isopropyl myristate and/or di-n-butyl sebacate.

In an embodiment, the MEED is n-propyltrimethoxysilane and isopropyl myristate.

In an embodiment, the MEED is n-propyltrimethoxysilane and di-n-butyl sebacate.

In an embodiment, the MEED is methylcyclohexyldimethoxysilane and di-n-butyl sebacate.

In an embodiment, the MEED is methylcyclohexyldimethoxysilane and isopropyl myristate.

In an embodiment, the MEED is dicyclopentyldimethoxysilane and isopropyl myristate.

In an embodiment, the MEED is dicyclopentyldimethoxysilane and di-n-butyl sebacate.

In an embodiment, the MEED is diisopropyldimethoxysilane and isopropyl myristate.

In an embodiment, the MEED is diisopropyldimethoxysilane and di-n-butyl sebacate.

The catalyst composition may comprise two or more embodiments disclosed herein.

In one embodiment of the present invention, the polymerization process includes contacting, under first polymerization conditions, propylene with the catalyst composition in a first polymerization reactor to form an active propylene-based polymer. As used herein, "polymerization conditions" are temperature and pressure parameters within a polymerization reactor suitable for promoting polymerization between the catalyst composition and an olefin to form the desired polymer. The polymerization process may be a gas phase polymerization process, a slurry polymerization process, or a bulk polymerization process, operating in one, or more than one, reactor. Accordingly, the polymerization reactor may be a gas phase polymerization reactor, a liquid-phase polymerization reactor, or a combination thereof.

The polymerization may be performed in two gas phase polymerization reactors connected in series. As used herein, "gas-phase polymerization" (or "gas-phase polymerization conditions") is the passage of an ascending fluidizing medium, the fluidizing medium containing one or more monomers, in the presence of a catalyst through a fluidized bed of polymer particles maintained in a fluidized state by the fluidizing medium. The contact between the propylene monomer and the Ziegler-Natta catalyst composition occurs in a reaction zone of the reactor.

The gas phase polymerization reactor may be a gas phase fluidized bed polymerization reactor. "Fluidization," "fluidized," or "fluidizing" is a gas-solid contacting process in which a bed of finely divided polymer particles is lifted and agitated by a rising stream of gas. Fluidization occurs in a bed of particulates when an upward flow of fluid through the interstices of the bed of particles attains a pressure differential and frictional resistance increment exceeding particulate weight. Thus, a "fluidized bed" is a plurality of polymer particles suspended in a fluidized state by a stream of a fluidizing medium. A "fluidizing medium" is one or more olefin gases, optionally a carrier gas (such $N_2$) and optionally a liquid (such as a hydrocarbon) which ascends through the gas-phase reactor.

A typical gas-phase fluidized bed polymerization reactor (or gas phase reactor) may include a vessel (i.e., the reactor), the fluidized bed, a distributor plate, an inlet and an outlet, piping, a compressor, a cycle gas cooler or heat exchanger, and a product discharge system. The vessel may include a reaction zone and a velocity reduction zone, each of which is located above the distributor plate. The fluidized bed may be located in the reaction zone. The fluidizing medium may pass through the gas-phase polymerization reactor at a velocity sufficient to maintain the bed of solid particles in a suspended condition. The gaseous stream containing unreacted gaseous monomer may be withdrawn from the reactor continuously, compressed, cooled, and recycled into the reactor. Product may be withdrawn from the reactor and make-up monomer is added to the recycle stream.

The fluidizing medium may include propylene monomer gas and at least one other gas such as an olefin and/or a carrier gas such as nitrogen. The fluidizing medium also may include hydrogen gas. During polymerization, hydrogen may be a chain transfer agent and may affect the molecular weight (and correspondingly the melt flow rate) of the resultant polymer.

Many operational parameters may be monitored and controlled during gas-phase polymerization. One parameter is fluidized bulk density. The "fluidized bulk density" (or "FBD") is the weight of solid (i.e., polymer particles) per unit volume in the fluidized bed. FBD is a mean value which may be greater or less than the localized bulk density at any point in the fixed reactor portion. FBD is a direct indicator of a gas phase reactor's operating health. Unexpected changes in FBD often indicate that the reactor may be experiencing problems. The FBD can include an upper fluidized bulk density (UFBD) and a lower fluidized bulk density (LFBD). Another parameter is settled bulk density.

The gas phase fluidized bed polymerization reactor may be a commercial scale reactor. A "commercial-scale reactor" is a polymerization reactor capable of producing 40 kilotons annually (KTA) or greater than 5 metric tons/hr of propylene-based polymer. A nonlimiting example of a commercial scale gas phase polymerization reactor is a UNIPOL™ reactor.

The catalyst composition may be fed into a lower section of the reactor. Reaction may occur upon contact between the catalyst composition and the fluidizing medium yielding growing polymer particles. The fluidizing medium may pass upward through the fluidized bed, providing a medium for heat transfer and fluidization. The reactor may include an expanded section located above the reaction zone. In the expanded section, particles having a terminal velocity higher than the velocity of the fluidizing medium may disentrain from the fluidizing medium stream. After leaving the reactor, the fluidizing medium may pass through a compressor and one or more heat exchangers to remove the heat of polymerization before it is re-introduced into the reaction section of the reactor. The fluidizing medium may or may not contain an amount of liquid after cooling and condensing.

Optionally, one or more olefin monomers can be introduced into a polymerization reactor along with the propylene to react with the procatalyst, cocatalyst, and EED and to form a polymer, or a fluidized bed of polymer particles. Nonlimiting examples of suitable olefin monomers include ethylene (for purposes of this disclosure, ethylene is considered an .alpha.-olefin), $C_{4-20}$ α-olefins, such as 1-butene, 1-pentene, 1-hexene, 4-methyl-1-pentene, 1-heptene, 1-octene, 1-decene, 1-dodecene and the like. In one embodiment, propylene is introduced as the sole α-olefin into the first polymerization reactor to form a propylene homopolymer.

In one embodiment, the polymerization process includes forming, in the first reactor, a propylene-based polymer having from 0.1 wt % or 0.5 wt %, or 1.0 wt %, or 1.5 wt %, or 2.0 wt %, or 2.5 wt %, or 3.0 wt %, or 3.5 wt % to 4.0 wt %, or 5.0 wt % to less than 6.0 wt % xylene solubles (XS). Weight percent XS is based on the total weight of the polymer.

The polymerization reaction may form a propylene homopolymer or a propylene copolymer. In an embodiment, the polymerization reaction forms propylene homopolymer.

In one embodiment, the process includes forming, in the first reactor, an active propylene-based polymer having one or more of the following properties: (i) a MFR greater than 100 g/10 min, or from 100 g/10 min to 200 g/10 min, as measured in accordance with ASTM D 1238, 2.16 kg, 230° C.; (ii) a xylene solubles content of less than 3% wt %, or from about 0.1 wt % to less than 2.0 wt %; and/or (iii) a $T_{MF}$ greater than about 165° C., or greater than 170° C. In a further embodiment, the propylene-based polymer with one or more properties (i)-(iii) is propylene homopolymer.

3. Second Polymerization

In one embodiment of the present invention, the active propylene-based polymer from the first polymerization reactor is introduced into a second polymerization reactor and contacted, under second polymerization conditions, with at least one second comonomer in the second reactor to form a propylene impact copolymer. The at least one second comonomer may be an olefin. As used herein, an "active propylene-based polymer" is a propylene-based polymer containing an amount of active catalyst that is capable of further polymerization upon exposure to an olefin under polymerization conditions. The second polymerization reactor may be a second gas phase polymerization reactor.

In one embodiment, the process includes contacting the active propylene-based polymer with propylene and ethylene in the second polymerization reactor under polymerization conditions, and forming a discontinuous phase of propylene/ethylene copolymer and further forming a propylene impact copolymer having a melt flow from 40 g/10 min, or 60 g/10 min, or 80 g/10 min to 100 g/10 min, as measured in accordance with ASTM D1238, 2.16 kg, 230° C.

In one embodiment, the process includes forming a propylene impact copolymer having an Fc value from 5 wt %, or 10 wt %, or 20 wt %, or 25 wt %, or 30 wt %, to 35 wt %, or 40 wt %, or 45 wt % to 50 wt %, or 55 wt %. As used herein, "fraction copolymer" ("Fc") is the weight percent of the discontinuous phase present in the heterophasic copolymer. The Fc value is based on the total weight of the propylene impact copolymer.

In one embodiment, the process includes forming a propylene impact copolymer with an Fc value from greater than 30 wt %, or 35 wt % to 40 wt %, or 45 wt %, or 50 wt %, or 55 wt %.

In one embodiment, the process includes forming a propylene impact copolymer having an Ec value from 10 wt %, or 20 wt %, or 30 wt %, or 40 wt %, or 50 wt % to 60 wt %, or 70 wt %, or 80 wt %, or 90 wt %. As used herein, "ethylene content" ("Ec") is the weight percent of ethylene present in the discontinuous phase of the propylene impact copolymer. The Ec value is based on the total weight of the discontinuous (or elastomeric) phase.

In one embodiment, the process includes forming a propylene impact copolymer having (i) an Fc value from 5 wt %, or 10 wt %, or 20 wt %, or 25 wt %, or 30 wt %, to 35 wt %, or 40 wt %, or 45 wt %, or 50 wt %, or 55 wt % and (ii) an Ec value from 10 wt %, or 20 wt %, or 30 wt %, or 40 wt %, or 50 wt % to 60 wt %, or 70 wt %, or 80 wt %, or 90 wt %.

In one embodiment, the process includes forming a propylene impact copolymer (i) having an Fc value from greater than 30 wt %, or 35 wt % to 40 wt %, or 45 wt %, or 50 wt %, or 55 wt %, the propylene impact copolymer also having (ii) a flowability of a minimum bin opening for free flow at zero storage time of 0.5 feet (ft), or 1.0 ft to 1.5 ft, or 2.0 ft, or 2.5 ft, or 3.0 ft; or (iii) a flowability of a minimum bin opening for free flow at a storage time of 5 minutes from 1 ft, or 2 ft, or 3 ft, or 4 ft, or 5 ft to 6 ft, or 7 ft, or 8 ft, or 9 ft, or 10 ft; (iv) and also having a settled bulk density greater than 17 lbs/ft$^3$, or 18 lbs/ft$^3$, or 19 lbs/ft$^3$, or 20 lbs/ft$^3$ to 21 lbs/ft$^3$, or 22 lbs/ft$^3$, or 23 lbs/ft$^3$; and (v) any combination of (i), (ii), (iii), and (iv).

Bounded by no particular theory, it is believed that MagTi precursor with the stated D50 particle size (19-30 microns) may produce a procatalyst composition with improved morphology. Morphology is improved in terms of the increased porosity when compared to procatalyst compositions prepared with a MagTi precursor with a D50 less than 18 microns. The procatalyst with improved porosity may improve flowability in propylene impact copolymer. Furthermore, the improved porosity does not negatively affect the settled bulk density of the formed propylene impact copolymer.

Any of the foregoing processes may comprise two or more embodiments disclosed herein.

The propylene impact copolymer polymer may comprise two or more embodiments disclosed herein.

Definitions

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference), especially with respect to the disclosure of synthetic techniques, definitions (to the extent not inconsistent with any definitions provided herein) and general knowledge in the art.

The numerical figures and ranges here are approximate, and thus may include values outside of the range unless otherwise indicated. Numerical ranges (e.g., as "X to Y", or "X or more" or "Y or less") include all values from and including the lower and the upper values, in increments of one unit, provided that there is a separation of at least two units between any lower value and any higher value. As an example, if a compositional, physical or other property, such as, for example, temperature, is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. For ranges containing explicit values (e.g., 1 or 2, or 3 to 5, or 6, or 7) any subrange between any two explicit values is included (e.g., 1 to 2; 2 to 6; 5 to 7; 3 to 7; 5 to 6; etc.).

The term "alkyl," as used herein, refers to a branched or unbranched, saturated or unsaturated acyclic hydrocarbon radical. Nonlimiting examples of suitable alkyl radicals include, for example, methyl, ethyl, n-propyl, i-propyl, n-butyl, t-butyl, i-butyl (or 2-methylpropyl), etc. The alkyls have 1 to 20 carbon atoms.

The term "aryl," as used herein, refers to an aromatic substituent which may be a single aromatic ring or multiple aromatic rings which are fused together, linked covalently, or linked to a common group such as a methylene or ethylene moiety. The aromatic ring(s) may include phenyl, naphthyl, anthracenyl, and biphenyl, among others. The aryls have from 1 to 20 carbon atoms.

The term, "bulk density," (or "BD") as used herein, is the density of the polymer produced. Bulk density is determined by pouring the polymer resin through a standard powder funnel into a stainless standard cylinder and determining the weight of the resin for the given volume of the filled cylinder in accordance with ASTM D 1895B or equivalent.

The term "composition," as used herein, includes a mixture of materials which comprise the composition, as well as reaction products and decomposition products formed from the materials of the composition.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

The term, "ethylene-based polymer," as used herein, refers to a polymer that comprises a majority weight percent polymerized ethylene monomer (based on the total weight of polymerizable monomers), and optionally may comprise at least one polymerized comonomer.

The term "interpolymer," as used herein, refers to polymers prepared by the polymerization of at least two different types of monomers. The generic term interpolymer thus includes copolymers, usually employed to refer to polymers prepared from two different monomers, and polymers prepared from more than two different types of monomers.

The term "olefin-based polymer" is a polymer containing, in polymerized form, a majority weight percent of an olefin, for example ethylene or propylene, based on the total weight of the polymer. Nonlimiting examples of olefin-based polymers include ethylene-based polymers and propylene-based polymers.

The term "polymer" is a macromolecular compound prepared by polymerizing monomers of the same or different type. "Polymer" includes homopolymers, copolymers, terpolymers, interpolymers, and so on. The term "interpolymer" means a polymer prepared by the polymerization of at least two types of monomers or comonomers. It includes, but is not limited to, copolymers (which usually refers to polymers prepared from two different types of monomers or comonomers, terpolymers (which usually refers to polymers prepared from three different types of monomers or comonomers), tetrapolymers (which usually refers to polymers prepared from four different types of monomers or comonomers), and the like.

A "primary alkyl group" has the structure —$CH_2R_1$ wherein $R_1$ is hydrogen or a substituted/unsubstituted hydrocarbyl group.

The term, "propylene-based polymer," as used herein, refers to a polymer that comprises propylene homopolymer or a majority weight percent polymerized propylene monomer (based on the total amount of polymerizable monomers), and optionally may comprise at least one polymerized comonomer.

A "secondary alkyl group" has the structure —$CHR_1R_2$ wherein each of $R_1$ and $R_2$ is a substituted/unsubstituted hydrocarbyl group.

The term "substituted alkyl," as used herein, refers to an alkyl as just described in which one or more hydrogen atom bound to any carbon of the alkyl is replaced by another group such as a halogen, aryl, substituted aryl, cycloalkyl, substituted cycloalkyl, heterocycloalkyl, substituted heterocycloalkyl, halogen, haloalkyl, hydroxy, amino, phosphido, alkoxy, amino, thio, nitro, and combinations thereof. Suitable substituted alkyls include, for example, benzyl, trifluoromethyl and the like.

A "tertiary alkyl group" has the structure —$CR_1R_2R_3$ wherein each of $R_1$, $R_2$, and $R_3$ is a substituted/unsubstituted hydrocarbyl group.

Hereinafter, the present invention will be described in more detail with reference to Examples. However, the scope of the present invention is not limited to the following Examples.

Examples

Test Methods

Melt flow rate (MFR) is measured in accordance with ASTM D 1238-01 test method at 230° C. with a 2.16 kg weight for propylene-based polymers.

Xylene soluble portion is determined by a method adapted from ASTM D5492-06. The procedure consists of weighing 2 g of sample and dissolving it in 200 ml o-xylene in a 400 ml flask with 24/40 joint. The flask is connected to a water cooled condenser and the contents are stirred and heated to reflux under $N_2$, and then maintained at reflux for an additional 30 minutes. The solution is then cooled in a temperature controlled water bath at 25° C. for a minimum of 45 minutes to allow the crystallization of the xylene insoluble fraction. Once the solution is cooled and the insoluble fraction precipitates from the solution, the separation of the xylene soluble portion (XS) from the xylene insoluble portion (XI) is achieved by filtering through 25 micron filter paper. 100 ml of the filtrate is collected into a pre-weighed aluminum pan, and the o-xylene is evaporated from this 100 ml of filtrate under a nitrogen stream. Once the solvent is evaporated, the pan and contents are placed in a 100° C. vacuum oven for 30 minutes or until dry. The pan is then allowed to cool to room temperature and weighed. Xylene soluble portion is calculated as XS (wt %)=[($m_3$−$m_2$)*2/$m_1$],*100, where $m_1$ is the original weight of the sample used, $m_2$ is the weight of empty aluminum pan, and $m_3$ is the weight of the pan and residue.

Cup Test Index is determined by a method developed in-house to measure powder flowability of high rubber content polypropylene impact copolymer powder. It is especially useful when resin tends to get sticky and angle of repose methods are difficult. The method procedure consists of filling a polystyrene cup (typically used for coffee) with resin powder. The cup is then inverted on a flat surface for 10 minutes. The cup is then removed and the tester then observes the shape of the powder and how long it takes to deform and collapse from the initial cup shape. The cup test results are also correlated to operational issues at a typical commercial gas phase polymerization unit operating the UNIPOL® Polypropylene process, which is available for license by W.R. Grace & Co.—Conn and/or its affiliates. Table 2 lists the Cup Index and typical operational issues.

TABLE 2

| Cup Test Index | Powder shape retention time (10 min test) | Typical Operational Consequences to Powder Handling System |
|---|---|---|
| 0 | Immediately loses its shape | No issues |
| 1 | 1 second to lose its shape | No issues |
| 2 | 15 seconds to lose its shape | No issues |
| 3 | 1 minute to lose its shape | No issues |
| 4 | Indefinite - needs some agitation to make it lose its shape | Observations of stickiness Some build up in rotary feeder |
| 5 | Indefinite - needs considerable agitation to make it lose its shape | Increased build up in rotary feeder Reduction in production rates |
| 6 | Indefinite - needs aggressive agitation to make it lose its shape | Considerable build up Potential to shut down production |
| 7 | Never | Not possible to run |

All the examples involve catalyst systems composed of (1) supported Ziegler-Nana catalyst, (2) co-catalyst, and (3) external electron donor. The following pro-catalysts, catalysts, co-catalyst, and external electron donors were employed in the examples, The pro-catalyst is a Ziegler-Natta catalyst detailed in Example 4 of U.S. Pat. No. 8,788,826 and U.S. Pat. No. 8,536,372. Two versions of this catalyst were produced with an average particle size of 12 micron (Catalyst A) and 27 micron (Catalyst B).

The Co-catalyst is TEAl (Triethylaluminum)

The external electron donor is a mixed external electron donor (MEED) system of a selectivity control agent (SCA) and activity limiting agent (ALA). In all the examples listed below, the MEED is 20% DCPDMS (dicyclopentyldimethoxysilane) as SCA and 80% IPM (iso-propylmyristate) as ALA.

Polypropylene impact copolymer (ICOP) was produced in the following comparative examples and examples. All polymerization reactions listed in the comparative examples and examples were conducted in a system of two gas phase fluidized-bed UNIPOL® polypropylene reactors available for license by W.R. Grace & Co.—Conn and/or its affiliates linked in series such as described in U.S. Pat. No. 4,882,380, the entire content of which is incorporated by reference herein. A homopolymer matrix is produced in the first reactor and an ethylene-propylene impact copolymer is produced in the second reactor. The impact copolymer (ICOP) product is discharged from the second reactor.

Detailed operating conditions and products information of all the comparative examples and examples are listed in the following table 3.

TABLE 3

| Example | | Comparative 1 | 2 | 3 |
|---|---|---|---|---|
| Catalyst Type | | Catalyst A | Catalyst B | Catalyst B |
| Average pro-catalyst Particle Size | (micron) | 12 | 27 | 27 |
| Reactor 1 Powder Properties | | | | |
| Melt Flow | (dg/min) | 4.8 | 16.7 | 5.0 |
| XS - Wet | (wt %) | 1.52 | 1.62 | 1.40 |
| Et | (wt %) | 0 | 0 | 0 |
| Reactor 2 Powder Properties | | | | |
| Melt Flow | (dg/min) | 1.77 | 4.42 | 1.84 |
| Fc | (wt %) | 33.7 | 30.3 | 33.0 |
| Ec | (wt %) | 40.7 | 39.2 | 39.5 |
| Reactor 1 Conditions | | | | |
| Reactor Temperature | (° C.) | 70 | 69 | 68 |
| Residence Time | (hr) | 1.0 | 1.1 | 1.1 |
| C3 Partial Pressure | (kg/cm$^2$) | 28.2 | 28.1 | 27.3 |
| C2 Partial Pressure | (kg/cm$^2$) | 0.0 | 0.0 | 0.0 |

TABLE 3-continued

| Example | | Comparative 1 | 2 | 3 |
|---|---|---|---|---|
| H2/C3 Molar Ratio | | 0.02235 | 0.04274 | 0.02751 |
| Alkyl Type | | TEAI | TEAI | TEAI |
| External Donor | | DCPDMS/IPM | DCPDMS/IPM | DCPDMS/IPM |
| TEAI/MEED Molar Feed Ratio | | 3.3 | 2.2 | 2.2 |
| Catalyst Productivity | (ton PP/kg catalyst) | 62.8 | 59.7 | 58.2 |
| Reactor 2 Conditions | | | | |
| Reactor Temperature | (° C.) | 70 | 70 | 70 |
| Residence Time | (hr) | 1.4 | 1.4 | 1.5 |
| C3 Partial Pressure | (kg/cm$^2$) | 9.5 | 10.0 | 9.5 |
| C2 Partial Pressure | (kg/cm$^2$) | 3.9 | 4.3 | 4.3 |
| C3/C2 Molar Ratio | | 2.5 | 2.3 | 2.2 |
| H2/C3 Molar Ratio | | 0.0352 | 0.0371 | 0.0533 |
| Total Catalyst Productivity | (ton PP/kg catalyst) | 88.9 | 84.3 | 83.7 |
| Cup Test Index | | 5 | 2 | 3 |
| Operational Comment | | Chunks were formed in Reactor 2. Buildup on Rotary Feeder | No issues | No issues |

* ® indicates a registered mark of W. R. Grace & Co. -Conn

In Comparative Example 1, the smaller 12 micron version of the pro-catalyst is used to produce ICOP powder with a rubber content, Fc, of 33.7 wt %. The partial pressures of propylene and ethylene and other conditions are given in Table 2. Reactor operation was generally smooth but in Comparative Example 1 with the high rubber content of 33.7 wt %, the cup test gave a value of 5 which indicates powder stickiness. In addition, chunks and agglomerates were found to be produced during this example.

In Examples 2 and 3, the larger 27 micron version of the pro-catalyst is used to produce ICOP powder with a rubber content, Fc of 30.3 and 33.0, respectively. The partial pressures of propylene and ethylene and other conditions are given in Table 2. Reactor operation was generally smooth and cup test values were lower than those produced with 12 micron catalyst. Even Example 3, which has a similar rubber content to Comparative Example 1, the cup test value was only a 3 and no operational issues were encountered nor any indications of resin stickiness.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A polymerization process comprising:
    halogenating, in the presence of a substituted 1,2-, 1,3- or 1,4-phenylene aromatic diester, particles of a MagTi procatalyst precursor having a particle size D50 from 19 microns to 30 microns to form particles of a procatalyst composition having a particle size D50 from 19 microns to 30 microns;
    wherein halogenating is carried out with a halogenating agent selected from a titanium halide having the formula Ti(OR$^e$)$_f$X$_h$:
        wherein R$^e$ is an aliphatic or aromatic hydrocarbon radical having 1 to 14 carbon atoms or COR', wherein R' is an aliphatic or aromatic hydrocarbon radical having 1 to 14 carbon atoms; each OR$^e$ group is the same or different; X is independently chlorine, bromine or iodine, f is an integer from 0 to 3; h is an integer from 1 to 4; and f+h is 4;
    first contacting, under first polymerization conditions, propylene monomer and optionally one or more first comonomers with a catalyst composition comprising the particles of the procatalyst composition in a first polymerization reactor to form an active propylene-based polymer having a melt flow rate greater than 100 g/10 min as measured in accordance with ASTM D 1238, 2.16 kg, 230° C.; and
    second contacting, under second polymerization conditions, the active propylene-based polymer with at least one second comonomer in a second polymerization reactor to form a propylene impact copolymer.

2. The process of claim 1 wherein the at least one second comonomer is an olefin monomer.

3. The process of claim 1 comprising halogenating the particles of the MagTi procatalyst precursor in the presence of 3-methyl-5-t-butyl-1,2-phenylene dibenzoate.

4. The process of claim 1 wherein the halogenating agent is titanium tetrabromide, or titanium tetrachloride or titanium trichloride.

5. The process of claim 1 comprising forming propylene impact copolymer having an Fc from 10 wt % to 55 wt %.

6. The process of claim 1 comprising forming propylene impact copolymer having an Fc from 25 wt % to 55 wt %.

7. The process of claim 1 comprising forming propylene impact copolymer having an Fc from 30 wt % to 55 wt %.

8. The process of claim 1 comprising forming particles of propylene impact copolymer having a settled bulk density greater than 17 lbs/ft$^3$.

9. The process of claim 1 wherein the substituted 1,2-phenylene aromatic diester has the structure (I),

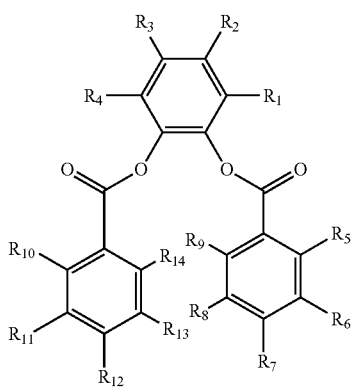

(I)

wherein $R_1$-$R_{14}$ are the same or different, each of $R_1$-$R_{14}$ may be independently selected from a hydrogen, substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof, provided that at least one of $R_1$-$R_{14}$ is not hydrogen.

10. A polymerization process comprising:

halogenating, in the presence of a substituted 1,2-, 1,3- or 1,4-phenylene aromatic diester, particles of a MagTi procatalyst precursor having a particle size D50 from 19 microns to 30 microns to form particles of a procatalyst composition having a particle size D50 from 19 microns to 30 microns;

first contacting, under first polymerization conditions, propylene monomer and optionally one or more first comonomers with a catalyst composition comprising the particles of the procatalyst composition in a first polymerization reactor, comprising forming an active propylene-based polymer having a melt flow rate greater than 100 g/10 min as measured in accordance with ASTM D 1238, 2.16 kg, 230° C.; and second contacting, under second polymerization conditions, the active propylene-based polymer with at least one second comonomer in a second polymerization reactor to form a propylene impact copolymer.

11. The process of claim 10 wherein the at least one second comonomer is an olefin monomer.

12. The process of claim 10 comprising halogenating the particles of the MagTi procatalyst precursor in the presence of 3-methyl-5-t-butyl-1,2-phenylene dibenzoate.

13. The process of claim 10 comprising forming propylene impact copolymer having an Fc from 10 wt % to 55 wt %.

14. The process of claim 10 comprising forming propylene impact copolymer having an Fc from 25 wt % to 55 wt %.

15. The process of claim 10 comprising forming propylene impact copolymer having an Fc from 30 wt % to 55 wt %.

16. The process of claim 10 comprising forming particles of propylene impact copolymer having a settled bulk density greater than 17 lbs/ft³.

17. The process of claim 10 wherein the substituted 1,2-phenylene aromatic diester has the structure (I),

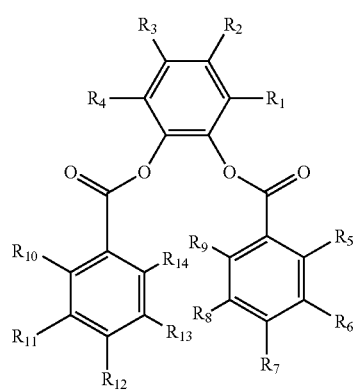

(I)

wherein $R_1$-$R_{14}$ are the same or different, each of $R_1$-$R_{14}$ may be independently selected from a hydrogen, substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof, provided that at least one of $R_1$-$R_{14}$ is not hydrogen.

* * * * *